Patented Apr. 26, 1927.

1,626,169

UNITED STATES PATENT OFFICE.

FRITZ STRAUB, OF BASEL, SWITZERLAND, ASSIGNOR TO THE FIRM: SOCIETY OF CHEMICAL INDUSTRY IN BASLE, OF BASEL, SWITZERLAND.

DYESTUFFS CONTAINING CHROMIUM AND PROCESS OF MAKING SAME.

No Drawing. Application filed January 29, 1926, Serial No. 84,757, and in Switzerland February 16, 1925.

The present invention relates to new acid wool dyestuffs containing chromium. It comprises the new dyestuffs, the process of making same, and the material dyed with the new products.

It has been found that valuable new dyestuffs containing chromium may be obtained by treating azo dyestuffs containing chromable groups with the so-called chromium chromates, i. e. with the products which are obtained by action of the salts of sulfurous or thiosulfuric acid on the salts of the hexavalent chromium (see Gmelin-Kraut, 7th edition, vol. III, first part, page 357).

The dyestuffs thus obtained, which have to be considered as complex chromium compounds of azo dyestuffs containing chromable groups, form yellow to brown and black powders, dissolving in water and in dilute caustic soda solution with yellow to red, blue, green and blackish coloration, and dyeing wool from an acid bath fast yellow to red and blue, green, black and brown tints.

Example 1.

37.8 parts of the dyestuff made from diazotized 4-chloro-1-aminobenzene-3-sulfonic acid and salicylic acid corresponding with the formula:

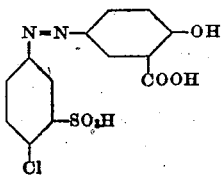

are dissolved in 1200 parts of boiling water. The solution is then treated with a chromium chromate paste of 7% strength the total content of chromium of which corresponding with 22.8 parts of $Cr_2O_3$, which chromium chromate is prepared by reaction of sodium bisulfite on potassium bichromate. The mixture so obtained is boiled for a long time in a reflux apparatus. The excess of chromium oxide is then separated by filtration and the dyestuff isolated by evaporation and salting out. It forms a yellow powder, dissolving in water and dilute caustic soda solution with yellow coloration, dyeing wool from a sulfuric acid bath fast greenish-yellow tints.

Example 2.

40.8 parts of the dyestuff made from diazotized 2-amino-1-phenol-4-chloro-5-sulfonic acid and 1-phenyl-3-methyl-5-pyrazolone corresponding with the formula:

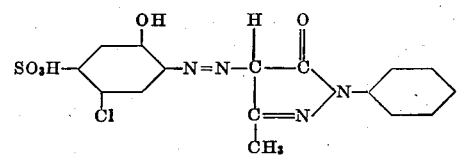

are dissolved in 2000 parts of boiling water. The solution is then treated with a chromium chromate paste of 7% strength the total content of chromium of which corresponding with 22.8 parts of $Cr_2O_3$, and the mixture is boiled for a long time in a reflux apparatus. The excess of chromium oxide is then separated by filtration and the dyestuff isolated by evaporation and salting out. It forms a blackish-brown powder, dissolving in water and dilute caustic soda solution with red coloration, dyeing wool from a sulfuric acid bath fast red tints.

Example 3.

49 parts of the dyestuff made from diazotized 1-amino-2-hydroxynaphthalene-4-sulfonic acid and 1-(3'-nitro)-phenyl-3-methyl-5-pyrazolone corresponding with the formula:

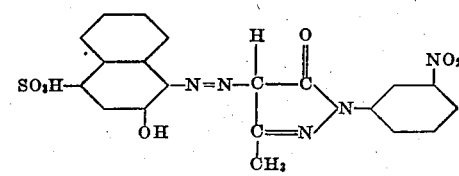

are dissolved in 1200 parts of boiling water. The solution is then treated with a chromium chromate paste of 7% strength the total content of chromium of which corresponding with 22.8 parts of $Cr_2O_3$, and the mixture is boiled for a long time in a reflux apparatus. The excess of chromium oxide is then separated by filtration and the dyestuff isolated by evaporation and salting out. It forms a brown powder, dissolving in water and dilute caustic soda solution with bluish-red coloration, dyeing wool from a sulfuric acid bath fast bluish-red tints.

Example 4.

39.4 parts of the dyestuff made from diazotized 1-amino-2-hydroxynaphthalene-4-sulfonic acid and α-naphthol corresponding with the formula:

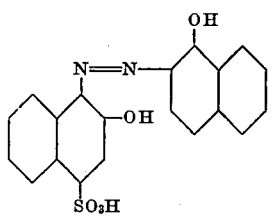

are dissolved in 1500 parts of boiling water. The solution is then treated with a chromium chromate paste of 7% strength, the total content of chromium of which corresponding with 22.8 parts of $Cr_2O_3$, and the mixture is boiled for a long time in a reflux apparatus. The excess of chromium oxide is then separated by filtration and the dyestuff isolated by evaporation and salting out. It forms a blackish powder, dissolving in water and dilute caustic soda solution with blackish-blue coloration, dyeing wool from a sulfuric acid bath fast blue tints.

A violet dyeing product is obtained with the dyestuff from diazotized 2-amino-4-methyl-1-phenol-5-sulfonic acid and β-naphthol.

Example 5.

41.1 parts of the dyestuff made from diazotized 2-amino-4-nitro-1-phenol and 1-hydroxynaphthalene-5-sulfonic acid corresponding with the formula:

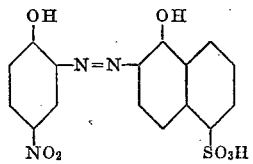

are dissolved in 1600 parts of boiling water. The solution is then treated with a chromium chromate paste of 7% strength, the total content of chromium of which corresponding with 22.8 parts of $Cr_2O_3$, and the mixture is boiled for a long time in a reflux apparatus. The excess of chromium oxide is then separated by filtration and the dyestuff isolated by evaporation and salting out. It forms a blackish powder, dissolving in water and dilute caustic soda solution with blackish-brown coloration, dyeing wool from a sulfuric acid bath fast brown tints.

Brown dyeing products are also obtained with the azo dyestuffs from diazotized o-aminophenolsulfonic acids and m-diamines of the benzene series, whereas green dyeing products are obtained from o-aminophenols and amines of the naphthalene series which combine in o-position to the amino-group. For instance the dyestuff from 5-nitro-2-amino-1-phenol and α-naphthylamine-4-sulfonic acid forms a dark powder, dissolving in water and dilute caustic soda solution with green coloration, dyeing wool fast green tints.

Example 6.

41.1 parts of the sodium salt of the dyestuff made from diazotized 6-nitro-2-amino-1-phenol-4-sulfonic acid and β-naphthol are dissolved in 800 parts of boiling water. The solution is then treated with a chromium chromate paste of 7% strength. The mixture is boiled for some time in a reflux apparatus and the chromium oxide in excess separated by filtration. The dyestuff is isolated by evaporation and salting out.

What I claim is:

1. A process for the production of new acid wool dyestuffs containing chromium, by treating azo dyestuffs containing chromable groups with chromium chromate.

2. A process for the production of new acid wool dyestuffs containing chromium, by treating the azo dyestuffs containing chromable groups, which are made from o-hydroxydiazo compounds, with chromium chromate.

3. As new products the new complex chromium compounds obtained by treating azo dyestuffs containing chromable groups with chromium chromate, which products form yellow to brown and black powders, dissolving in water and in dilute caustic soda solution with yellow to red, blue, green and blackish coloration, and dyeing wool from an acid bath fast yellow to red and blue, green, black and brown tints.

4. Material dyed with the dyestuffs of claim 3.

In witness whereof I have hereunto signed my name this 16th day of January, 1926.

FRITZ STRAUB.